United States Patent [19]

Collins, Jr.

[11] Patent Number: 4,626,046

[45] Date of Patent: Dec. 2, 1986

[54] TANK TREAD ASSEMBLIES WITH TRACK-LINKING MECHANISM

[75] Inventor: Earl R. Collins, Jr., LaCanada, Calif.

[73] Assignee: The United States of America as represented by the Administrator of the National Aeronautics and Space Administration, Washington, D.C.

[21] Appl. No.: 692,802

[22] Filed: Jan. 18, 1985

[51] Int. Cl.$^4$ .................. B62D 55/20; B62D 55/28
[52] U.S. Cl. .................. 305/36; 305/58 PC; 305/51; 305/58 R; 474/220
[58] Field of Search .............. 474/206, 219, 220, 223; 305/36, 37, 38, 39, 53, 58 R, 58 PC, 51

[56] References Cited

U.S. PATENT DOCUMENTS

| | | | |
|---|---|---|---|
| 169,955 | 11/1875 | Bushnell | 305/58 X |
| 2,648,989 | 8/1953 | Cordis | 474/223 |
| 2,746,116 | 5/1956 | Craven | 474/220 X |
| 2,933,351 | 4/1960 | Backaus, Jr. | 305/53 X |
| 3,017,225 | 1/1962 | Ruf | 305/51 |
| 3,058,783 | 10/1962 | Wadsworth et al. | 305/51 |
| 3,117,824 | 1/1964 | Wadsworth et al. | 305/51 |
| 3,542,439 | 3/1969 | Joos | 305/34 |
| 3,666,327 | 5/1972 | Padilla | 305/35 |
| 4,068,905 | 1/1978 | Black et al. | 305/51 |
| 4,159,856 | 7/1979 | Pietzsch et al. | 305/51 |
| 4,165,906 | 8/1979 | Fix | 305/51 |
| 4,185,877 | 1/1980 | Tanoue et al. | 305/35 |
| 4,262,972 | 4/1981 | Falk | 305/35 R |
| 4,359,248 | 11/1982 | Kortering | 305/46 |

FOREIGN PATENT DOCUMENTS 2632594 1/1978 Fed. Rep. of Germany .... 305/58 R
580627 11/1924 France .............................. 305/35 R Primary Examiner—David A. Scherbel
Attorney, Agent, or Firm—Paul F. McCaul; John R. Manning; Thomas H. Jones

[57] ABSTRACT

A tank tread assembly having adjacent tank tread segments joined by a link bearing tapered pins retained by clips inserted through the tread shells perpendicular to the axes of the pins and having highway pads attached by a release rod bearing tapered, grooved cams which interlockingly engage tabs inserted into the tread shells.

7 Claims, 8 Drawing Figures

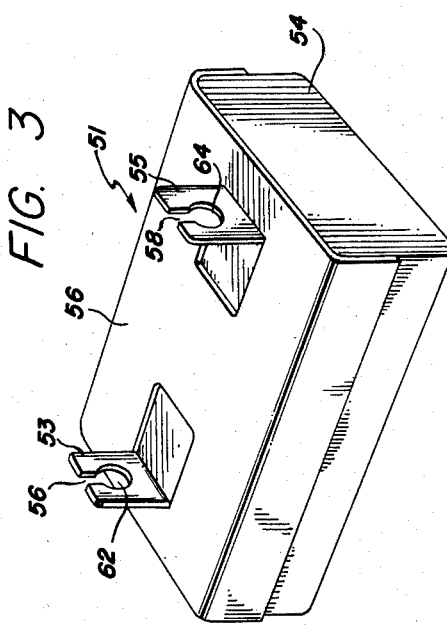
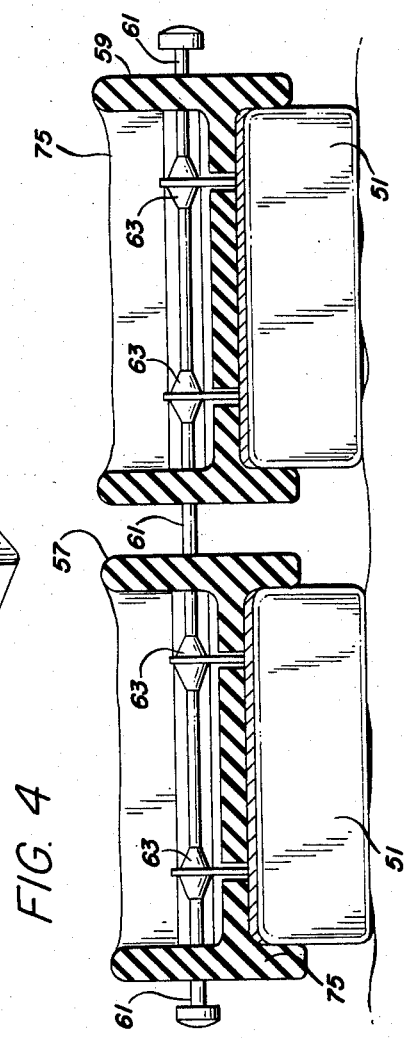

TANK TREAD ASSEMBLIES WITH TRACK-LINKING MECHANISM

The invention described herein was made in the performance of work under a NASA Contract and is subject to the provisions of Public Law 96517 (35 USC 202) in which the contractor has elected not to retain title.

BACKGROUND OF THE INVENTION

1. Field of the Invention

The subject invention relates to track vehicles, and more particularly to improvements in assembling links and highway pads of such vehicles.

2. Brief Description of the Prior Art

Conventional links of track vehicles such as tanks require tensioning with chain-tighteners or similar tools in order to place the links over projecting pins connected to tread segments. The projecting pins are encapsulated in rubber with which the tank tread is filled. The rubber allows for torsional rotation of the pins as the tread passes over the ends of the track, and over uneven ground. Thus there is no rotational bearing to be degraded by sand, grit and the like. The link is pushed onto the pins after the treads are pulled close to each other by a tensioning tool, and the link is locked to the pins by tightening an internal bolt which draws up a wedge. The jamming action of the wedge also acts to prevent rotation of the pins with respect to the link.

In use, the internal bolts are subjected to forces which tend to stretch and loosen them. It is common practice to have to stop frequently and retighten the bolts on every link. This operation could cause a tread to be cast if neglected and could cause potentially disastrous delays during combat operations. Since the bolt heads are not always accessible—as when under the bogies, and on the inside of the inner treads—current practice is to tighten the bolts on the treads at the ends of the track. Each bolt tightening requires moving the tank a few inches to bring up the next set of tread segments; repeated for every set of 32 segments, a slow, frustrating and prolonged procedure.

An additional problem with current tread assemblies is the relatively slow assembly time of highway pads attached to the treads to facilitate high speed highway travel. Proposed quick assembly pads employ retaining mechanisms which rely on bending or gripping and may be subject to failure or which exert forces tending to release the pad itself.

SUMMARY OF THE INVENTION

It is therefore an object of the invention to improve tank track assemblies.

It is still another object of the invention to provide improvements in track assemblies which increase speed of assembly and provide superior retaining characteristics over the prior art.

It is another object of the invention to provide an improved mechanism for joining together and holding in place adjacent track segments forming a track of a track vehicle.

It is another object of the invention to provide an improved highway pad for a track vehicle.

In accordance with these and other objects of the invention, a link is disclosed having two tapered pins for connecting adjacent tank tread segments together. The tapered pins are driven into sleeves encapsulated in rubber within the tank tread. Once inserted, the pins are held in place by a clip inserted through a recess in the tread and passing about a locking groove on the pins. The tapers on adjacent surfaces of the pins act as cams to draw adjacent tread segments together as the link is driven into place.

Further, according to the invention, rubber highway pads are provided for the tank treads having projecting tabs which are pushed into place within the tank tread. Slots in the tabs pass a small-diameter shank section in a release rod. Moving the release rod axially causes tapered, double-ended cams on the release rod to engage close-fitting holes in the projecting tabs to retain the highway pads. Moving the release rod in either direction disengages the cams, releasing the pads. In one embodiment, the release rod is hammered or pried from either end to engage and disengage; in an alternative embodiment the release rod is threaded and turned by a hex wrench.

BRIEF DESCRIPTION OF THE DRAWINGS

The just-summarized invention will now be described in detail in conjunction with the drawings of which:

FIG. 3 is a perspective of a highway pad according to the preferred embodiment;

FIG. 4 is a cross-sectional view showing the preferred highway pad mounted on a track;

DETAILED DESCRIPTION OF THE PREFERRED EMBODIMENT

Figure 1:
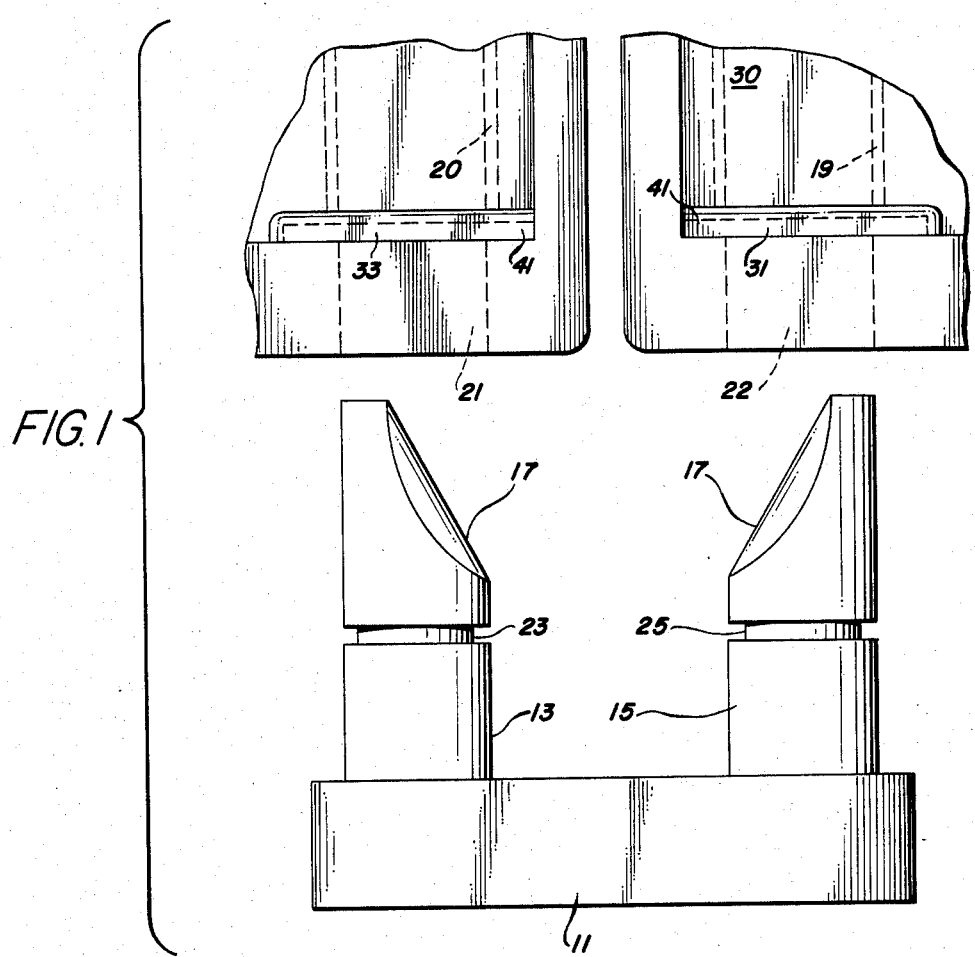
FIG. 1 is a top view of the track-linking mechanism of the preferred embodiment.
Figure 2:
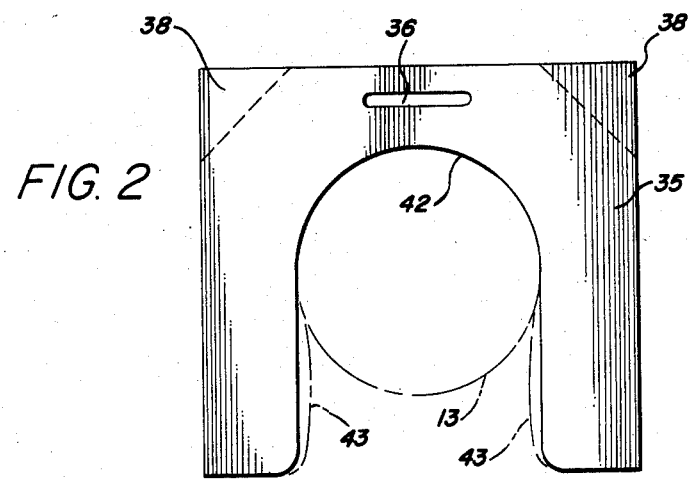
FIG. 2 is a side view of a locking clip for use with the mechanism of FIG. 1.

FIGS. 1 and 2 illustrate the tank tread end connector of the preferred embodiment. FIG. 1 shows a link 11 formed with integral pins 13, 15, preferably by forging, with the pins having a taper 17 on their adjacent surfaces. Thus, as the link 11 is driven into steel sleeves 19, 20 in the tank tread shells 21, 22, the tapers 17 act as cams to draw the track tight, eliminating the need for external tensioning tools. Each pin 13, 15 is provided with a locking groove 23, 25, shown as a circumferential belt or slot, which is easily turned on a lathe, if the link assembly is welded together. If the assembly is forged as one piece, grooves 23, 25 can be replaced by two square notches on each side of the respective pins 13, 15.

The steel sleeves 19, 20 are molded into the rubber fill 30 of the tank tread shells 21, 22. The rubber provides torsional motion, as in the prior art. Rectangular locking clip openings 31, 33 are provided inside the lip of the tank tread shell. These openings 31, 33 are placed above the location of the locking grooves 23, 25 when the pins 13, 15 are fully inserted.

A locking clip 35 is shown in FIG. 2. The clip 35 is generally planar and includes a pry slot 36 and first and second corners 38 bent out of plane. The clip 35 is pushed down past the pins 13, 15 from above, and hammered into place against the resistance of the spring force exerted against the rectangular clip openings 31, 33 by the bent corners 38 of the clip 35. Thus, the bent corners 38 and the walls of the respective grooves 23, 25 exert retaining forces which hold a clip 35 in place against gravity forces. The clip 35 is prevented from rotating, and thus wearing away the bent corners 38 and the walls of the grooves 23, 25, by having one of its straight sides in contact with the tank tread, e.g., at point 41 in FIG. 1. Thus, there is no need to retighten end connectors periodically. An additional retaining force may be obtained by narrowing the entrance passage 42 of the clip 35, as shown by the dotted lines 43 in FIG. 2.

The slot 36 is provided at the top of the clip 35 for prying the clip 35 out of place when track disassembly is desired. Assembly and disassembly are best carried out at the ends of the track, moving the tank for each successive tread segment. Since there is no need to retighten bolts every few miles, a substantial gain is obtained in man-hours, cost and operational ability.

It should be noted that the clips 35 do not prevent rotation of the pins 13, 15 in the sleeves; however, this function may be accomplished by staples which lock the sleeves together against relative rotation.

FIG. 3 shows the improved highway pad 51. The pad 51 includes retaining tabs 53, 55 formed by dies from the steel pad shell 56. Each tab 53, 55 has an access slot 56, 58 leading to a hole 62, 64 having a steel pad shell 56 and a rubber pad 54. Alternatively, the tabs 53, 55 may be made from a thicker plate of steel and welded to the steel shell 56. The latter embodiment may be preferred, in order to better resist the axial forces attendant on locking the pads 51 in place. FIG. 4 illustrates a pair of improved road pads 51 in place under the two adjacent treads 57, 59 of one tank track assembly. The pads 51 are held in position by one long rod 61 passing through both treads.

As shown in FIGS. 4–7, the release (and retaining) rod 61 bears four sets of hardened double-ended tapered cams 63 which have a central concave groove 65. The access slots 56, 58 of the tabs 53, 55 are made wide enough to clear the small-diameter shank 67 of the release rod 61. Thus, the cam diameter is an interference fit with the holes 62, 64 of the tabs 53, 55.

When assembling the highway pads 51, the release rod 61 is moved so that the cams 63 are out of line with the openings in the tank tread shells 57, 59 through which the tabs 53, 55 will enter. This can be done easily by hand, since there is no force on the release rod 61 other than friction. The adjacent pair of highway pads 51 are put in place—either at the top of the tank track, or at an end—so that the tabs' slots 56, 58 pass the shank 67 of the release rod. The release rod 61 is then moved back until the cams 63 enter the holes 62, 64; thereafter a hammer is used to drive the cams 63 fully into the holes 62, 64. The cams 63 force the sides of the tabs 53, 55 apart a bit, until the tabs 53, 55 fall into the reduced diameter of the concave groove 65. Each tab 53, 55 snaps shut around the groove 65, retaining the tabs 53, 55 in place against forces from every direction except along the rod axis 69.

Figure 5:
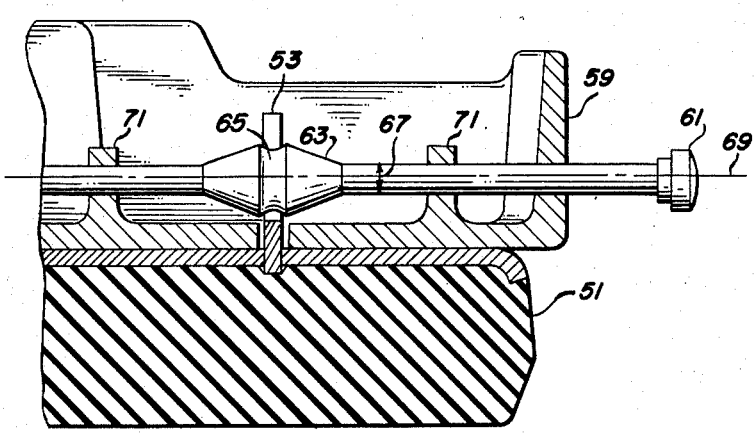
FIGS. 5, 6 and 7 are orthogonal views illustrating the release rod mechanism of the preferred highway pad.
Figure 6:
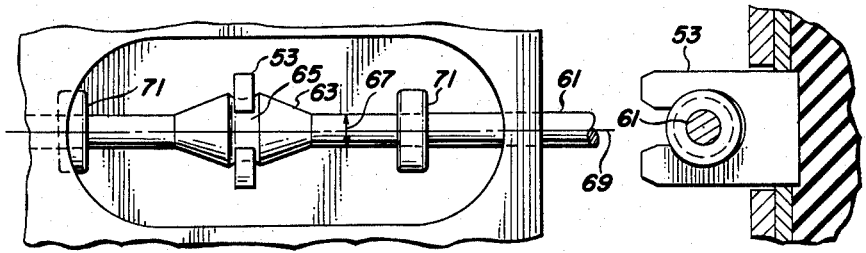
Figure 7:
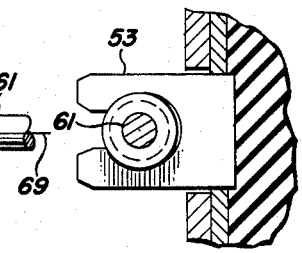

As shown in FIGS. 5–7, the rod may be supported by guides 71 on each side of a tab 53, the guides 71 being integral with the tank tread shell 57, 59. Slight misalignments and tolerance buildups are accommodated by the compliance of the rod 61, which can bend a reasonable amount. Alternatively, as shown in FIG. 4, the rod can be passed through sections of metal sleeves within an encapsulating rubber fill 75 in the tank tread shell. This latter aproach more effectively seals the mechanism against dirt, etc. When releasing or assembling the pads 53, 55, the rod 61 can be hammered axially from either end, or moved with a pry bar. Thus, the crew need not crawl under the tank's belly for either operation unless sheltering from rain, hail, sight, etc. is desired.

Figure 8:
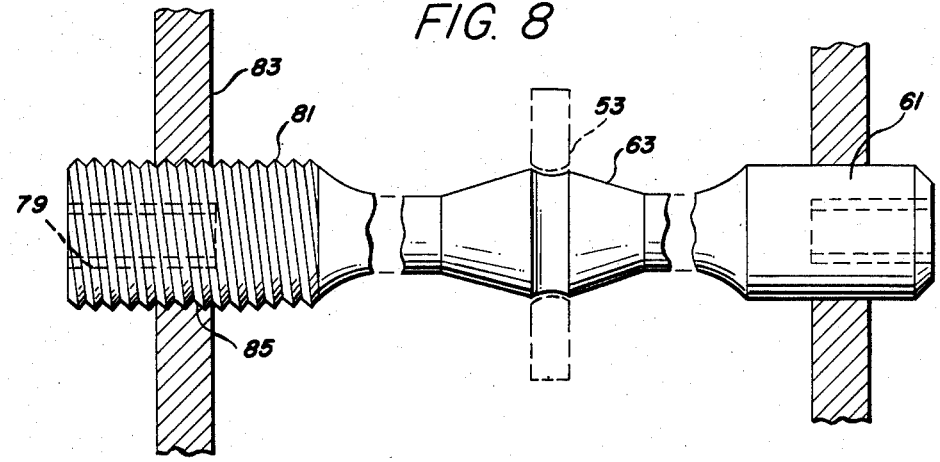
FIG. 8 illustrates an alternative embodiment incorporating a threaded release rod.

The alternative embodiment of FIG. 8 shows a threaded release rod 61; only one cam 63 is indicated, for simplicity. Each end of the forged rod 61 contains a wrench access 79, as for a hexagonal wrench, for example. Only one end 81 of the rod 61 is threaded, to prevent problems which arise when trying to turn against two sets of threads not likely to be spaced properly apart under field conditions. The rod 61 of FIG. 8 is shown with the cam 63 in the locked position and the threaded end 81 turned halfway through the shell wall 83. Turning from either end, in either direction will disengage the cams 63 from the tabs 53, 55 and release the pads 51. While this embodiment appears to be slower to actuate, it does have the virtue of having better resistance to accidental actuation, especially if the threads are tight (or a locking insert, such as a "Nylok," is used). In addition, without the road pads 51 in place, the release rods 61 will not be free to rattle back and forth as in the first-described embodiment, with which a system for retaining the rods during off-highway operations appears desirable. Since the threaded holes 85 will clear the cams 63, these release rods 61 can be withdrawn during field use, and inserted when converting to highway travel.

As will be apparent to those skilled in the art aided by the foregoing disclosure, the subject invention is susceptible to numerous modifications and adaptations without departing from the scope and spirit of the invention. Therefore, it is to be understood that, within the scope of the appended claims, the invention may be practiced other than as specifically described herein.

What is claimed is:

1. Assembly apparatus for use with tread shells of a vehicle track comprising:
   first and second sleeves in respective first and second tread shells of said track, each said sleeve being encapsulated in rubber;
   a link member;
   first and second pin means attached to said link member for insertion, respectively, into said first and second sleeves;
   first and second taper means on said first and second pin means, respectively, for urging said shells together;
   respective first and second locking grooves formed respectively on said first and second pin means;
   an opening in each of said first and second tread shells;
   clip means insertable through said openings for interlockingly engaging said locking grooves;
   highway pad means having first and second tabs therein;
   an internal cavity in each of said track shells;
   openings in said track shells to receive said first and second tabs, and
   release rod means insertable into said cavity for interlocking with said highway pad means for retaining said highway pad means in position adjacent said track.

2. Assembly apparatus for use with tread shells of a vehicle track comprising:
   first and second sleeves in respective first and second tread shells of said track, each said sleeve being encapsulated in rubber;
   a link member;

first and second pin means attached to said link member for insertion, respectively, into said first and second sleeves;

first and second taper means on said first and second pin means, respectively, for urging said shells together;

respective first and second locking grooves formed respectively on said first and second pin means;

an opening in each of said first and second tread shells; and clip means insertable through said openings for interlockingly engaging said locking grooves.

3. The assembly apparatus of claim 2 wherein said link member and first and second pin means comprise one forged steel piece.

4. The assembly apparatus of claim 3 wherein said first and second sleeves are each constructed of steel.

5. The assembly apparatus of claim 2 wherein said first and second taper means comprise:

first and second oppositely opposed tapers forming a wedge-shaped opening between said first and second pin means tapering from a widest width at the end of said pin means closest to said link member to a narrower width at the end of said tapers, said tapers terminating prior to said locking grooves.

6. The assembly apparatus of claim 2 wherein each said pin means comprises a cylindrical pin, said locking groove being formed as a circular slot about said pin.

7. The assembly apparatus of claim 6 wherein said first and second taper means each comprises a tapered surface on each said cylindrical pin, each tapered surface tapering from the diameter of said cylinder near said locking groove to a narrower width at the end of said pin opposite said link member.

* * * * *